US009508102B2

(12) United States Patent
Thibaux et al.

(10) Patent No.: US 9,508,102 B2
(45) Date of Patent: Nov. 29, 2016

(54) METHODS AND SYSTEMS FOR TRACKING OF USER INTERACTIONS WITH CONTENT IN SOCIAL NETWORKS

(75) Inventors: Romain Thibaux, Fremont, CA (US); Eric Seo, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 342 days.

(21) Appl. No.: 13/557,735

(22) Filed: Jul. 25, 2012

(65) Prior Publication Data

US 2014/0033074 A1 Jan. 30, 2014

(51) Int. Cl.

| | |
|---|---|
| ***G06F 3/048*** | (2013.01) |
| ***G06Q 50/00*** | (2012.01) |
| ***G06F 17/30*** | (2006.01) |
| ***H04L 29/08*** | (2006.01) |
| *G06Q 30/02* | (2012.01) |

(52) U.S. Cl.

CPC ............... *G06Q 50/01* (2013.01); *G06F 3/048* (2013.01); *G06F 17/30867* (2013.01); *H04L 67/22* (2013.01); *G06Q 30/02* (2013.01)

(58) Field of Classification Search

CPC .............................. G06Q 30/02; G06Q 50/01

USPC .......................................................... 715/753

See application file for complete search history.

(56) References Cited

U.S. PATENT DOCUMENTS

| | | | | |
|---|---|---|---|---|
| 6,832,351 | B1 * | 12/2004 | Batres | 715/234 |
| 7,769,805 | B1 * | 8/2010 | Barnes | G06F 9/4443 709/203 |
| 8,291,016 | B1 * | 10/2012 | Whitney et al. | 709/204 |
| 2002/0099812 | A1 * | 7/2002 | Davis et al. | 709/224 |
| 2004/0123239 | A1 * | 6/2004 | Roessler | G06F 17/30899 715/744 |
| 2005/0203849 | A1 * | 9/2005 | Benson | 705/51 |
| 2013/0339907 | A1 * | 12/2013 | Matas et al. | 715/853 |

* cited by examiner

*Primary Examiner* — Jennifer To
*Assistant Examiner* — Ashley Fortino
(74) *Attorney, Agent, or Firm* — Perkins Coie LLP

(57) ABSTRACT

Techniques to track interactions with content on a social network. In one embodiment, references are embedded within content to be presented to a user. At least one identifying reference from among the references is received in response to an interaction by the user with the content. The identifying reference is stored in a memory caching system as a record of the interaction. The references may comprise a key and a type. The key may be associated with the content and the type may be associated with components in the content. The interaction may involve selection by the user of a component within a story.

19 Claims, 14 Drawing Sheets

```
<news_feed (data_ft=[ type=YYY ])>
    •••                              ╭─602
    <news_story (data_ft=[ key=AAA ])>
        •••
        <user_profile (data_ft=[ type=1 ])>
            •••
            <user_profile_picture (data_ft=[ type=5 ])>
                •••
            </user_profile_picture>
            <user_name (data_ft=[ type=6 ])>
                •••
            </user_name>
        </user_profile>
        <link (data_ft=[ type=2 ])>
            •••
            <link_word (data_ft=[ type=7 ])>
                •••
            </link_word>
            <link_thumbnail (data_ft=[ type=8 ])>
                •••
            </link_thumbnail>
            <link_title (data_ft=[ type=9 ])>
                •••
            </link_title>
            <link_synopsis (data_ft=[ type=10 ])>
                •••
            </link_synopsis>
            <link_URL (data_ft=[ type=11 ])>
                •••
            </link_URL>
        </link>
        <comment (data_ft=[ type=3 ])>
            •••
            <timestamp (data_ft=[ type=12 ])>
                •••
            </timestamp>        ╭─603
            <comment_box (data_ft=[ type=13 ])>
                •••
            </comment_box>
        </comment>
        <close (data_ft=[ type=4 ])>
            •••
        </close>
    </news_story>
</news_feed>
```

FIGURE 6

```
<user_profile_picture (data_ft=[ key=AAA && type=5 ])>
    •••
</user_profile_picture>

<user_name (data_ft=[ key=AAA && type=6 ])>
    •••
</user_name>

<link_word (data_ft=[ key=AAA && type=7 ])>
    •••
</link_word>

<link_thumbnail (data_ft=[ key=AAA && type=8 ])>
    •••
</link_thumbnail>

<link_title (data_ft=[ key=AAA && type=9 ])>
    •••
</link_title>

<link_synopsis (data_ft=[ key=AAA && type=10 ])>
    •••
</link_synopsis>

<link_URL (data_ft=[ key=AAA && type=11 ])>
    •••
</link_URL>

<timestamp (data_ft=[ key=AAA && type=12 ])>
    •••
</timestamp>

<comment_box (data_ft=[ key=AAA && type=13 ])>
    •••
</comment_box>

<close (data_ft=[ key=AAA && type=4 ])>
    •••
</close>
```

FIGURE 10

METHODS AND SYSTEMS FOR TRACKING OF USER INTERACTIONS WITH CONTENT IN SOCIAL NETWORKS

FIELD OF THE INVENTION

The present invention relates to the field of social networking. More particularly, the present invention provides a process for tracking interactions with content items.

BACKGROUND

Internet social networks have become a compelling social phenomenon. Internet social networks allow users to, for example, maintain profiles, grant other users access to their profiles, interact with each other's profiles, post media on their profiles, and perform other actions. Users may create content or interact with content posted on the profiles of their friends within the network. In a social network, an Internet user typically builds a group of friends or followers who receive updates of the user's activity. Each instance of user activity generates a story that is visible to other users on their homepages, most notably the user's friends. For example, the action of a user posting a link to an article on his profile may generate a story. Other users, in turn, may comment on the link, click the link, or select an option indicating that they 'like' the link. The stories generated by a user's creation of content and his interactions with the profiles of other users summarize the user's activity on the social network.

As the volume of users of a social network grows, the number of user interactions and content items created by users increases exponentially. Social networks employ increasingly sophisticated techniques for classifying user actions and content items such that patterns in user activity may be identified. Determining these patterns enables operators of social networks to not only monetize the social networking platform through the placement of targeted advertising, but to optimize and enhance the user experience. For example, many users have a high number of friends whose activity generates upwards of hundreds of stories a day. Rather than simply displaying all of these stories in chronological order on a user's homepage, the social network may wish to selectively display only those stories with which the user is likely to interact.

As the variety of content that social networks allow their users to post and the manner in which that content is displayed evolve, the mechanisms for tracking user interactions must also evolve. For example, a story may contain a link to an article, a profile picture with an embedded link to the user's profile, and a text link to the user's profile. If one of the user's friends clicks a link to the user's profile, the social network may wish to know whether the friend clicked the profile picture or the text link. Similarly, if the friend clicks on the link to the article, the social network may wish to know whether it was clicked from within the user's profile or from the "news feed" within the friend's homepage. If the links within the story contain no information other than the uniform resource locator ("URL") of the user's profile or the article, the social network may not know exactly which link the friend has clicked.

SUMMARY

To track user interactions with content within a social network, a social networking system embeds references within content for presentation to a user. At least one identifying reference from among the references is received by the social networking system in response to an interaction with the content by the user. The identifying reference is stored in a memory caching system as a record of the interaction.

In an embodiment of the invention, the references may include a key associated with the content and a type associated with components in the content. The content may comprise a story describing a user activity. The key may identify the story with which the user interacted and the type may identify the component of the story with which the user interacted. The references may be organized in a hierarchical structure. The interaction may be recorded in an interaction log.

In an embodiment of the invention, the content may be designed by the social networking system to include hypertext markup language elements. The content may be represented as a document object model. The references in the content may be provided to a client device, and the identifying reference may be written to a cookie on the client device.

In an embodiment of the invention, the content may be provided by the social networking system as an advertisement. An encrypted impression may be embedded within the content. The encrypted impression may include advertising data and may be received by the social networking system with the identifying reference.

Many other features and embodiments of the invention will be apparent from the accompanying drawings and from the following detailed description.

BRIEF DESCRIPTION OF THE DRAWINGS

FIG. 6 depicts a portion of a document object model for a news feed in accordance with an embodiment of the invention.

FIG. 10 depicts a document object model for a mobile platform in accordance with an embodiment of the invention.

Figure 1:
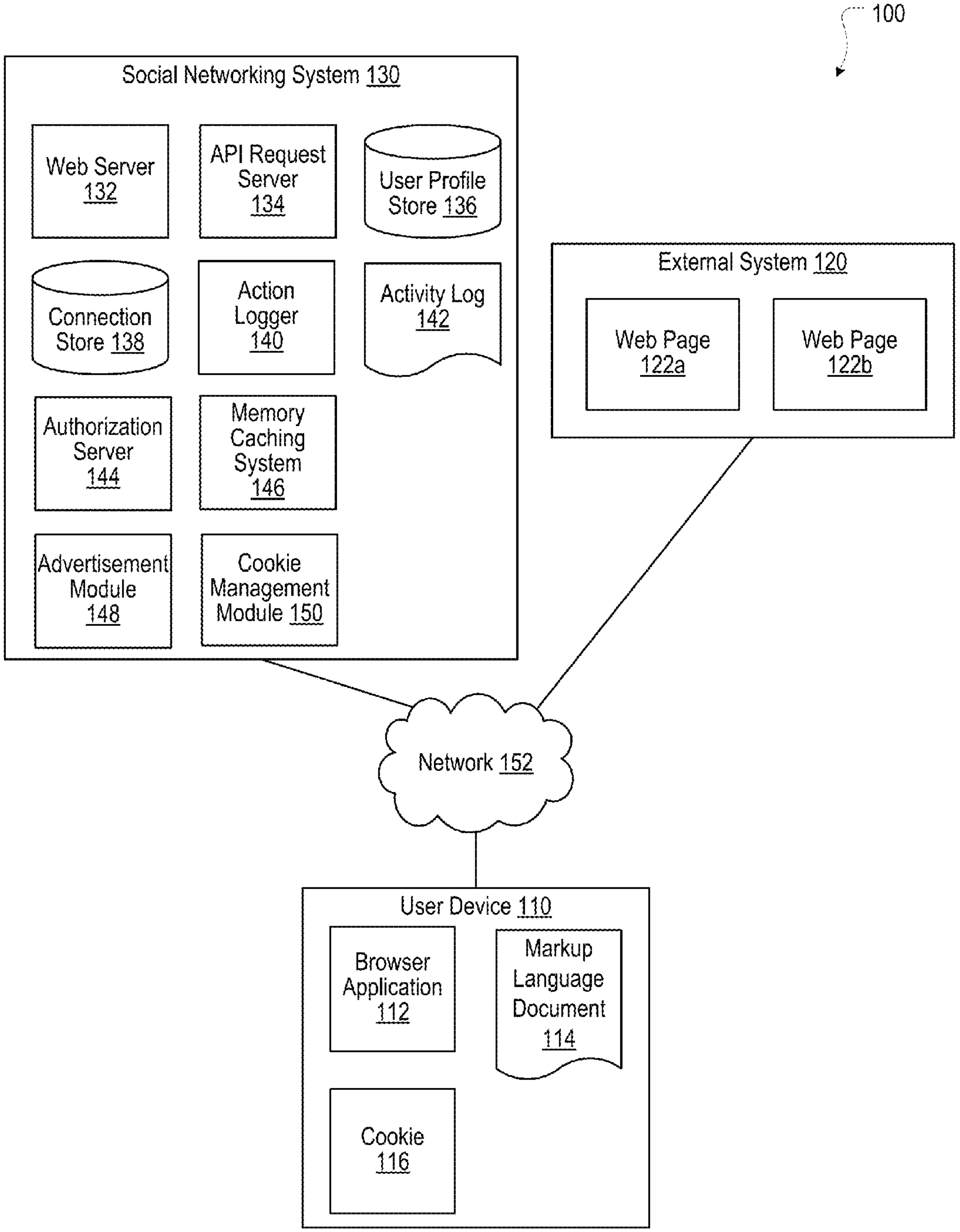
FIG. 1 depicts a network diagram of a system for efficient tracking of social network interactions in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated herein may be employed without departing from the principles of the invention described herein.

DETAILED DESCRIPTION

Social Networking System Architecture

FIG. 1 is a network diagram of a system 100 for efficient tracking of user interactions within a social networking system 130 in accordance with an embodiment of the invention. The system 100 includes one or more user devices 110, one or more external systems 120, the social networking system 130, and a network 152. For purposes of illustration, the embodiment of the system 100 shown by FIG. 1 includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform, or backbone, which other systems, such as external systems 120, may use to provide social networking services and functionalities to users across the Internet.

The user device 110 comprises one or more computing devices that can receive input from a user and can transmit and receive data via the network 152. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smartphone, a tablet, a personal digital assistant (PDA), a mobile telephone, etc. The user device 110 is configured to communicate via the network 152. The user device 110 can execute an application, for example, a browser application that allows a user of the user device 110 to interact with the social networking system 130. In another embodiment, the user device 110 interacts with the social networking system 130 through an application programming interface (API) that runs on the native operating system of the user device 110, such as iOS and ANDROID. The user device 110 is configured to communicate with the external system 120 and the social networking system 130 via the network 152, which may comprise any combination of local area and/or wide area networks, using wired and/or wireless communication systems.

In one embodiment, the network 152 uses standard communications technologies and/or protocols. Thus, the network 152 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 152 can include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over the network 152 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, a markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode such a markup language document 114.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers including one or more web pages 122*a*, 122*b*, which are communicated to the user device 110 using the network 152. The external system 120 is separate from the social networking system 130. For example, the external system 120 is associated with a first domain while the social networking system 130 is associated with a separate social networking domain. Web pages 122*a*, 122*b* included in the external system 120 comprise markup language documents identifying content and including instructions specifying formatting or presentation of the identified content.

The social networking system 130 comprises one or more computing devices storing a social network, or a "social graph", including a plurality of users and providing users of the social network with the ability to communicate and interact with other users of the social network. Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of a social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system 130 may belong, events or calendar entries in which a user might be interested, computer-based applications that a user may use via the social networking system 130, transactions that allow users to buy or sell items via the service, and interactions with advertisements that a user may perform on or off the social networking system 130. These are just a few examples of the items upon which a user may act on a social networking system 130, and many others are possible. A user may interact with anything that is capable of being represented in the social networking system 130 or in the external system 120, separate from the social networking system 130, coupled to the social networking system 130 via the network 152.

The social networking system 130 is also capable of linking a variety of entities. For example, the social networking system 130 enables users to interact with each other as well as external systems 120 or other entities through an API or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph represents a particular kind of connection, or association, between the two nodes, which may result from node relationships or from an action that was performed by one of the nodes on the other node. For example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. Each instance of a user posting or creating a content item generates a story, which is visible to the user's friends or followers within their respective news feeds. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, a memory caching system 146 or other suitable memory device, an advertisement module 148, and a cookie management module 150. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains user profiles, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, and the social networking system 130 generates a new instance of a user profile in the user profile store 136, assigns a unique identifier to the user profile, and begins to populate the fields of the user profile with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136 and the activity log 142 enables the social networking system 130 to generate the social graph that uses nodes to identify various objects and edges connecting nodes to identify relationships between different objects. For example, if a first user establishes a connection with a second user in the social networking system 130, user profiles of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 152. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to access information from the social networking system 130 by calling one or more APIs. The API request server 134 may also allow external systems 120 to send information to the social networking system 130 by calling APIs. The external system 120, in one embodiment, sends an API request to the social networking system 130 via the network 152, and the API request server 134 receives the API request. The API request server 134 processes the request by calling an API associated with the API request to generate an appropriate response, which the API request server 134 communicates to the external system 120 via the network 152. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 is associated with each user's profile, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122*a* within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user profile information like profile photo, phone numbers associated with the user, user's connections, actions taken by the user such as adding a connection, changing user profile information, and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information and granularity of specification of entities with which information is shared are possible. For example, all personal information may be shared with friends whereas all work information may be shared with friends of friends.

The authorization server 144 contains logic to determine if certain information associated with a user can be accessed by a user's friends, external systems 120 and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

Tracking of User Interactions

As described above, each user activity within the social network may generate a story, a discrete representation of the activity that may appear on a user's profile and in other users' feeds or news feeds. The operator of the social networking system 130 may wish to keep track of story impressions and user interactions with each story in order to implement optimizations and enhancements. By identifying which stories were displayed to a user and which stories the user interacted with, the social network may customize the user's news feed to include only those stories with which the user is likely to interact. In addition, determining exactly which element of a story a user interacted with may allow the social network to further optimize the user experience both for specific users and for the user base at large.

According to an embodiment of the invention, the social networking system 130 may implement a server-side scripting language, such as PHP, to produce dynamic web pages. Stories may be generated in a markup language using PHP or other suitable scripting language. In an embodiment of the invention, data pertaining to a story may be recorded in a variety of logs. For example, a data log may record the story type and classification information (e.g., article link, photo upload, status update, etc). As another example, an impression log may record the various users who see the story. As yet another example, an interaction log may record the various user interactions with the story and the manner in which the interactions occurred. The logs may be implemented as arrays, matrices, or any data structure. Any number of logs and processes for modeling the logs may be used.

According to an embodiment of the invention, the social networking system 130 may receive an indication about an activity from a first user of a social network. The activity may be an article posting, a status update, a 'like', a comment, a share, a photo upload, a new friendship, or any other interaction, activity, or event that may occur or be known to the social networking system 130. A story for the activity is then created. The story may include links to the first user's profile, a link to the content items being posted, a link to the pictures being uploaded, or any other items that can be interacted with by another user who views the story. The story may include any type of data pertaining to the activity. A second user of the social network may log into his account on the social networking system 130. The second user may be a friend of the first user or any user who has access to the first user's profile. The social networking system 130 may then receive an indication that the second user has accessed a resource including at least one story related to the first user. According to one embodiment of the invention, the resource may be the second user's news feed, which may be presented to the second user upon logging in to the social networking system 130 or accessing a 'home' screen. The news feed may comprise stories summarizing the activity of the first user and others who are friends of the second user. Other implementations of the news feed are possible. According to an embodiment of the invention, the resource may be the first user's profile, which may list the stories generated by the first user's activity within the social network. Any resource may be used. Upon request, the resource including the story may then be transmitted to the second user and displayed within the resource. The appearance of the story to the second user may be recorded as an impression in an impression log. In an embodiment of the invention, this process may be performed entirely or partially by the social networking system 130.

While the process described above tracks story impressions, an operator of the social networking system 130 may wish to track user interactions with stories and other content in order to optimize the user experience, monetize the user's activity, or otherwise achieve a goal of the social networking system 130. For example, the stories may be categorized by the social networking system 130 according to various criteria. The operator of the social networking system 130 may wish to determine which types of stories the user typically interacts with and which types of stories the user typically ignores in order to selectively display within the user's news feed only those stories with which the user is likely to interact. Moreover, the operator of the social networking system 130 may wish to discern which element of the story the user has interacted with and the context within which the interaction occurred. For example, if the user accessed a friend's profile from a story, the operator of the social networking system 130 may wish to determine whether the user clicked the friend's name or clicked the friend's profile picture, both of which may be included in the story as links to the friend's profile. Data pertaining to which types of stories users interact with the most and how the users interact with them may be gathered and used for various optimizations, enhancements, and user-specific customizations. For example, the social networking system 130 may use the data to train machine learning models that predict various user preferences. As another example, the data may be used for performance counters that enable the social networking system 130 to track advanced metrics pertaining to user activity and the popularity of different types of content. The operator of the social networking system 130 may also wish to determine what type of story should be generated about a particular event. For example, a user may often interact with stories about comments on his friend's photos but may ignore earlier stories about the friend having uploaded the photos. The operator of the social networking system 130 may use this information to decide that stories about comments on friends' photos should be displayed within the user's news feed in preference to stories about the friends' having uploaded the photos. Although the underlying activity that forms the basis for a story may be the same (e.g., a user's friend uploading new photos), the type and appearance of a story that is generated for the activity may vary based on the types of stories with which the user typically interacts.

Figure 2:
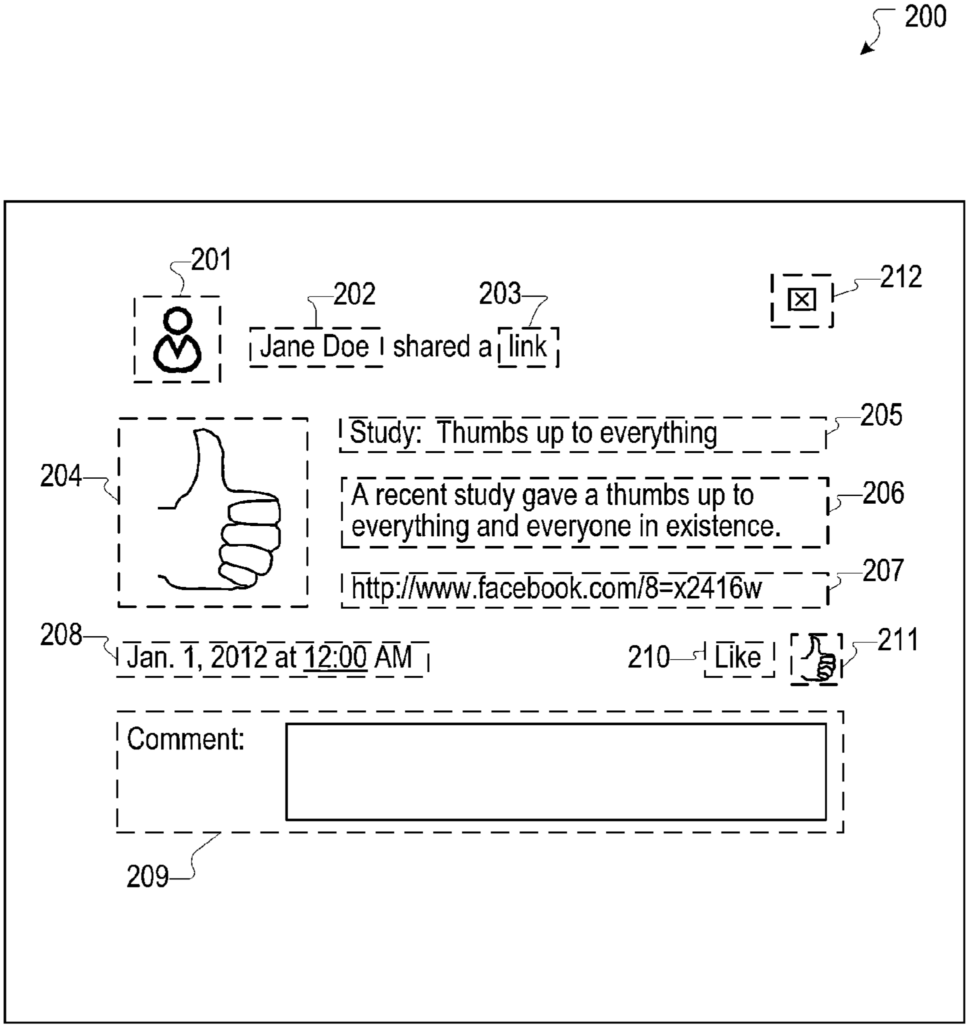
FIG. 2 depicts a story in accordance with an embodiment of the invention.

Thus, according to one embodiment of the invention, the stories may be designed and implemented such that the content of each story is divided into parts. Each part may be represented as a discrete item, such as an HTML element. Multiple elements may link to the same resource, but may be distinguished so that the social networking system 130 may determine how the user accessed that resource. FIG. 2 illustrates an example implementation of a story 200 in accordance with an embodiment of the invention. The story 200 is associated with an article posted by user Jane Doe. The story 200 includes components 201-212 that link to Jane Doe's profile, the article, and options to 'like' or comment on the link. The component 201, which corresponds to Jane's profile picture, and the component 202, which corresponds to Jane's name, link to Jane's profile. The component 203, which corresponds to the word 'link', the component 204, which corresponds to a thumbnail accompanying the article, the component 205, which corresponds to the title of the article, the component 206, which corresponds to a brief synopsis of the article, and the component 207, which corresponds to the URL of the article, link to the article. The component 208, which corresponds to the timestamp of the story, and the component 209, which corresponds to a comment box, link to commenting functionality. The component 210, which corresponds to the word 'like', and the component 211, which corresponds to a thumbs up icon, link to 'like' functionality. The component 212, which corresponds to the X, links to functionality for hiding the story. Other components not shown in FIG. 2 may also be included in a story.

According to one embodiment of the invention, each story may be uniquely identified using a reference, such as a key. The various components comprising the story may be embedded within each other and identified using other references, such as a type. Thus, each component within a story may be uniquely identified using a combination of that story's key and the element's type. This structure may be implemented using a document object model ("DOM") hierarchy. DOM is a convention for representing and interacting with elements in documents, particularly those written using a markup language for display within a web browser. According to one embodiment, the components may be modeled as elements within a DOM formatted using a markup language, such as the hypertext markup language (HTML). Any format for the DOM may be used.

Figure 3:
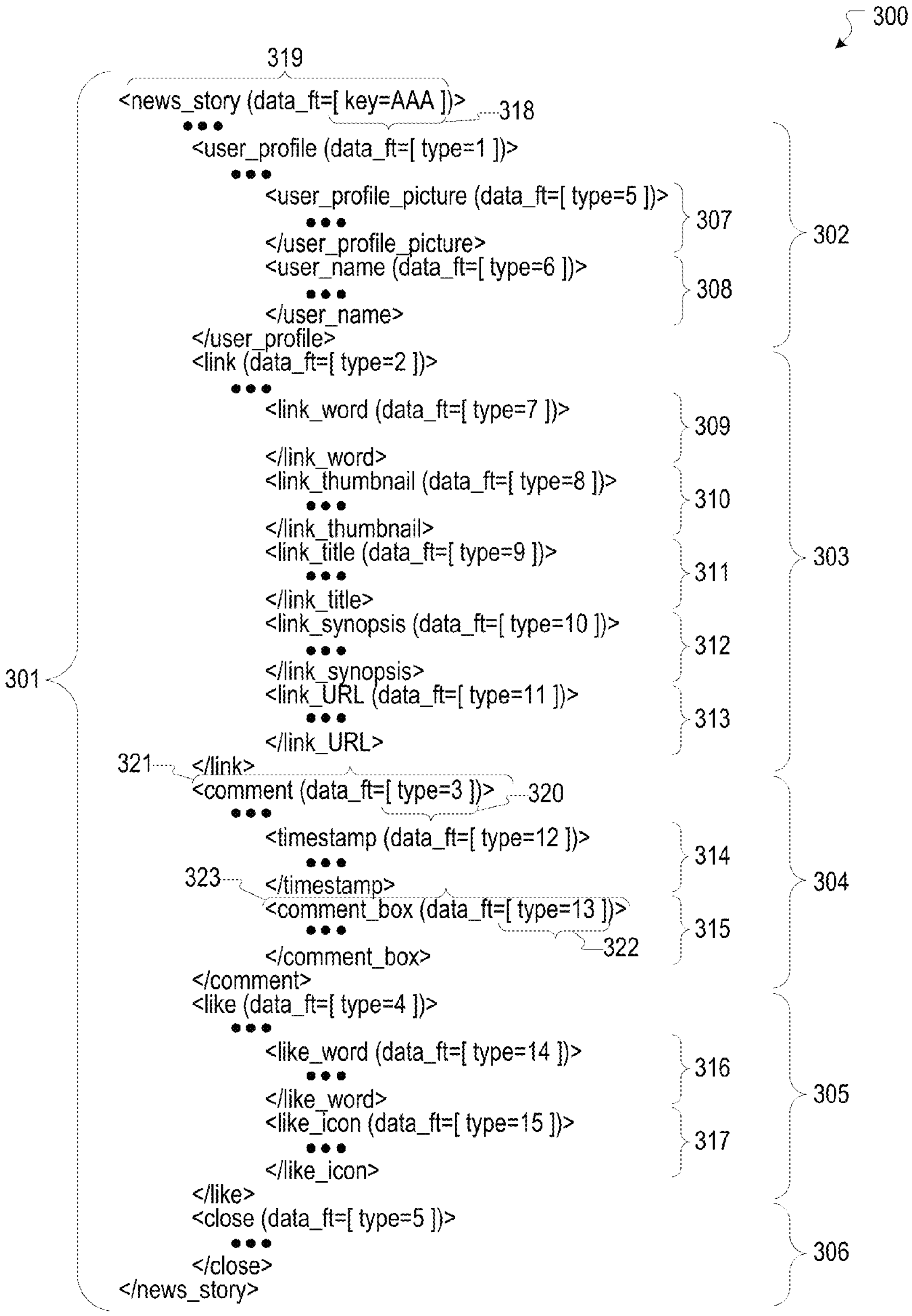
FIG. 3 depicts a document object model for a story in accordance with an embodiment of the invention.

FIG. 3 depicts an example DOM 300 for the story 200 in accordance with an embodiment of the invention. The highest level element <news_story> 301 represents the story as a whole. Within element <news_story> 301 are elements <user_profile> 302, <link> 303, <comment> 304, <like> 305, and <close> 306 representing the user's profile, the article link, the comment functionality, the like functionality, and the close functionality, respectively. Element <user_profile> 302 is a container for the two elements that represent the profile of the user that created the story, namely element <user_profile_picture> 307, which corresponds to the component 201, and element <user_name> 308, which corresponds to the component 202. Element <link> 303 is a container for the five elements that represent the article link posted by the user, namely element <link_word> 309, which corresponds to the component 203, element <link_thumbnail> 310, which corresponds to component 204, element <link_title> 311, which corresponds to the component 205, element <link_synopsis> 312, which corresponds to the component 206, and element <link_URL> 313, which corresponds to the component 207. Element <comment> 304 is a container for the two elements that represent comment functionality for the story, namely element <timestamp> 314, which corresponds to the component 208, and element <comment_box> 315, which corresponds to the component 209. Element <like> 305 is a container for the two elements that represent 'like' functionality for the story, namely element <like_word> 316, which corresponds to the component 210, and element <like_icon> 317, which corresponds to the component 211. Element <close> 306 represents functionality for hiding or closing the story, which corresponds to the component 212.

In the example illustrated in FIG. 3, a key may be embedded within the start tag of the element <news_story> 301. A multitude of types that describe each component of the story may be embedded within a corresponding element's start tag. Both the key and the type may be assigned to an attribute. In an embodiment, the attribute may be referred to as 'data_ft'. Each story may be uniquely identified by its key, whereas each component element may be uniquely identified by its type and the key or type of any other elements within which it may be embedded. For example, the element <news_story> 301 is uniquely identified by key 318, which is embedded within start tag 319 of the element <news_story> 301. The value of the key 318 is set to 'AAA'. The element <comment> 304 is uniquely identified by the key 318 of the element <news_story> 301 and type 320 embedded within start tag 321 of the element <comment> 304. The value of the type 320 is set to 3. The element <comment_box> 315 is uniquely identified by the key 318 of the element <news_story> 301, the type 320 of the element <comment> 304, and type 322 embedded within start tag 323 of the element <comment_box> 315.

Links to the respective resources that each element represents (e.g., user profile, article link, comment functionality, like functionality) may also be embedded within the elements. These links, along with other content and data that may be embedded within an element, are not shown but suggested by the ellipses shown below each element's start tag in the DOM 300, which are included to simplify depiction. In this example, the story and its constituent parts are modeled as custom, user-defined markup language elements. However, generic HTML elements (such as the <div> element) may also be used. For example, the 'like' functionality may be represented as the HTML <form> element, wherein the <form> attributes identify the story to which the 'like' option corresponds. Any other suitable technique for modeling the elements of a story may be used.

Each element corresponding to a component in a story may be uniquely identified by a key and at least one type. According to an embodiment of the invention, the key and type may be the only data items transmitted to the social networking system 130 upon the occurrence of a user interaction. Using the key and the type, the social networking system 130 can look up which element within the story with which the user has interacted.

In this manner, conventional implementations in which multiple variables corresponding to various classifications of an element are transmitted to the user's client device when the story is generated can be avoided. In such conventional implementations, the data is then transmitted back to a server when an interaction occurs in order to convey all of the information about precisely which element within a story the user interacted with. Due to the sheer volume of requests handled by a social network with hundreds of millions of active users, the transmission of such large amounts of data in conventional implementations is undesirable.

In an embodiment of the invention, when a story is created, the data describing that story may be recorded in a data log and the transmission of the story to a user may be recorded in an impression log. The impression log, along with the various other logs that accompany a story, may be stored in the memory caching system 146. According to one embodiment of the invention, the memory caching system 146 is kept as a separate storage component from the databases where stories and user profile data is stored for archival and later retrieval. Because database queries are time- and resource-intensive operations, it would be desirable for a social network with hundreds of millions of active users to minimize the number of database queries performed. According to an embodiment, the logs may be maintained in the memory caching system 146 for a fixed, discrete length of time after the story is created and transmitted. According to an embodiment, the logs may be stored elsewhere. Thus, the identifying data that the social networking system 130 transmits with a story may be the story's key and the type information of each element within the story, and this information is used to identify the appropriate logs within the memory caching system 146 corresponding to the relevant story. The amount of data transmitted during a request and the number of database queries required to retrieve this data are thereby minimized.

In addition, the hierarchical model and the memory caching system 146 may limit the amount of data describing the internal implementation of the social networking system 130 that is exposed to the public. Without the hierarchical model and the memory caching system 146, more explicit tracking data would have to be included in the page source and transmitted back to the social networking system 130 in order to specify the particular element within a story with which a user had interacted. Because a web page is a text document formatted in a markup language, the page source of a web page is readily available to a user. If the page source includes explicit tracking data that specifies classes, variables, or other information revealing the internal details of the social networking system 130, malicious users may attempt to write scripts that exploit this information to, for example, spam, impersonate, or otherwise hack the accounts of other users. Thus, it is desirable to limit the amount of data pertaining to the internal implementation of the social networking system 130 that is exposed to the user.

Figure 4:
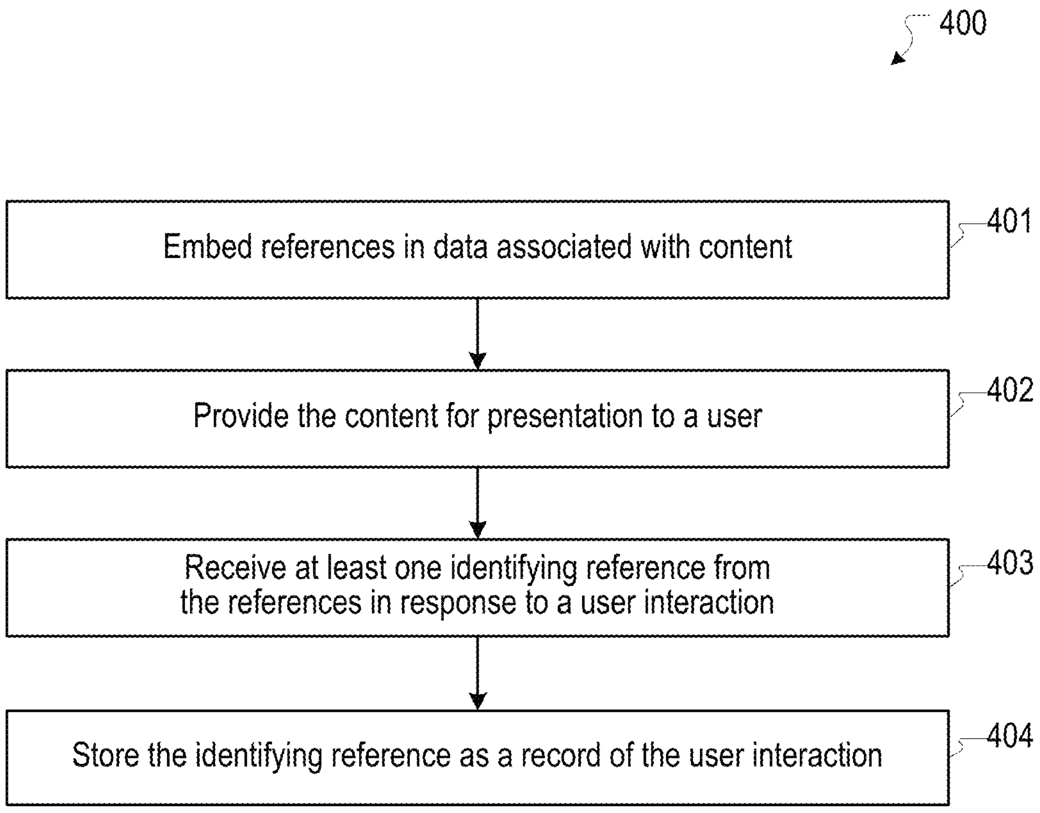
FIG. 4 illustrates a process for tracking story interactions in accordance with an embodiment of the invention.

FIG. 4 illustrates a process 400 for tracking story interactions in accordance with an embodiment of the invention. At block 401, the social networking system 130 embeds a plurality of references in content to be presented to a user. The social networking system 130 transmits the data and content to the user's client device. The user's client device receives an interaction with the content from the user. The interaction may be a like, a comment, a click, or any other action taken by the user that may directly or indirectly relate to the content. Any interaction may be used. The client device retrieves identifying references from the data corresponding to the specific element within the story that the user has interacted with. The user's client device transmits the identifying references to the social networking system 130. At block 402, the social networking system 130 provides the content for presentation to a user. At block 403 the social networking system 130 receives at least one identifying reference from among the references. At block 404, the social networking system 130 stores the identifying reference as a record of the interaction. According to one embodiment of the invention, the identifying reference may be stored in at least one log, which the social networking system 130 may retrieve from the memory caching system 146. According to one embodiment of the invention, the identifying reference may be stored in, for example, an interaction log.

Figure 5:
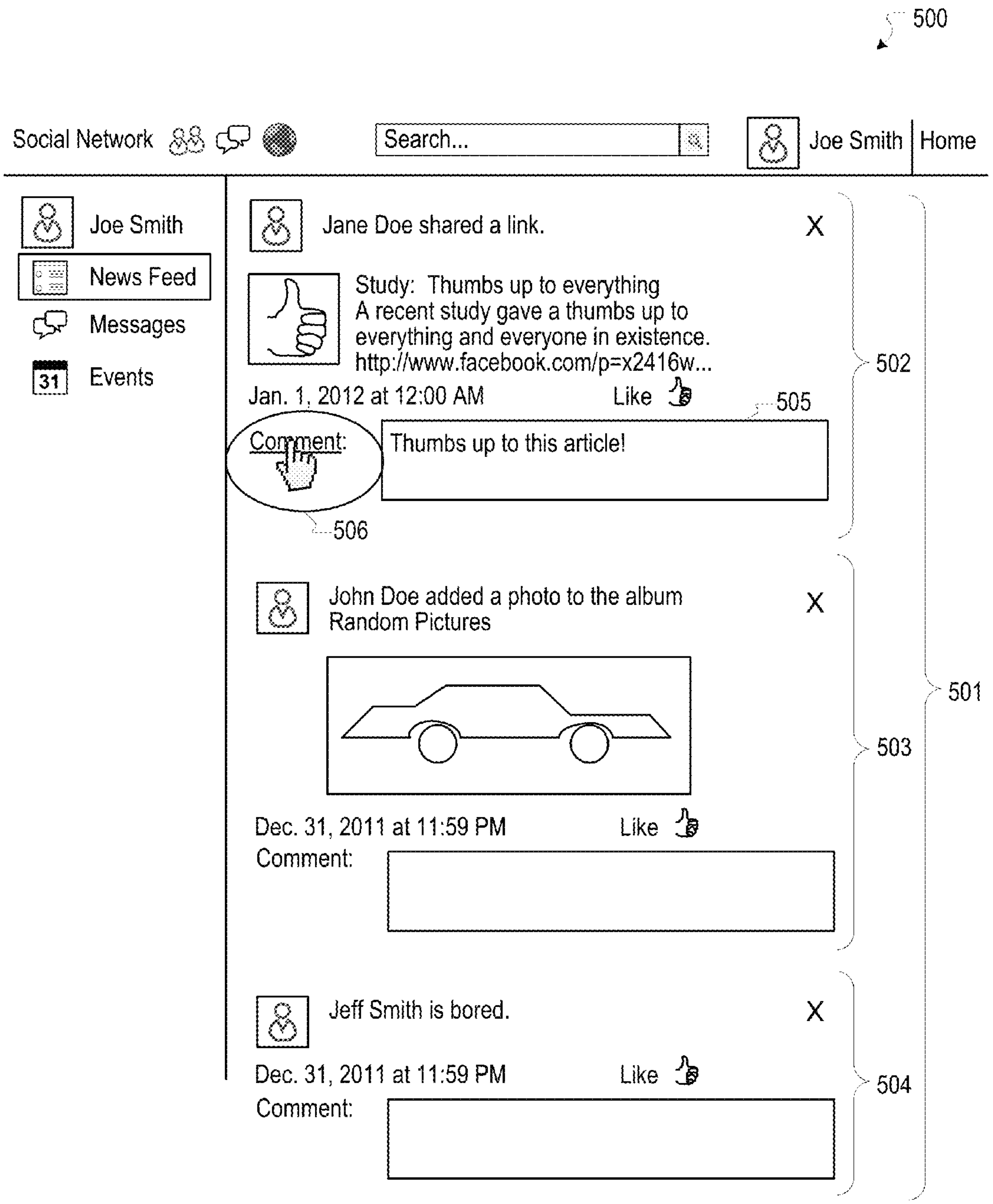
FIG. 5 depicts a webpage showing a news feed in accordance with an embodiment of the invention.
Figure 7:
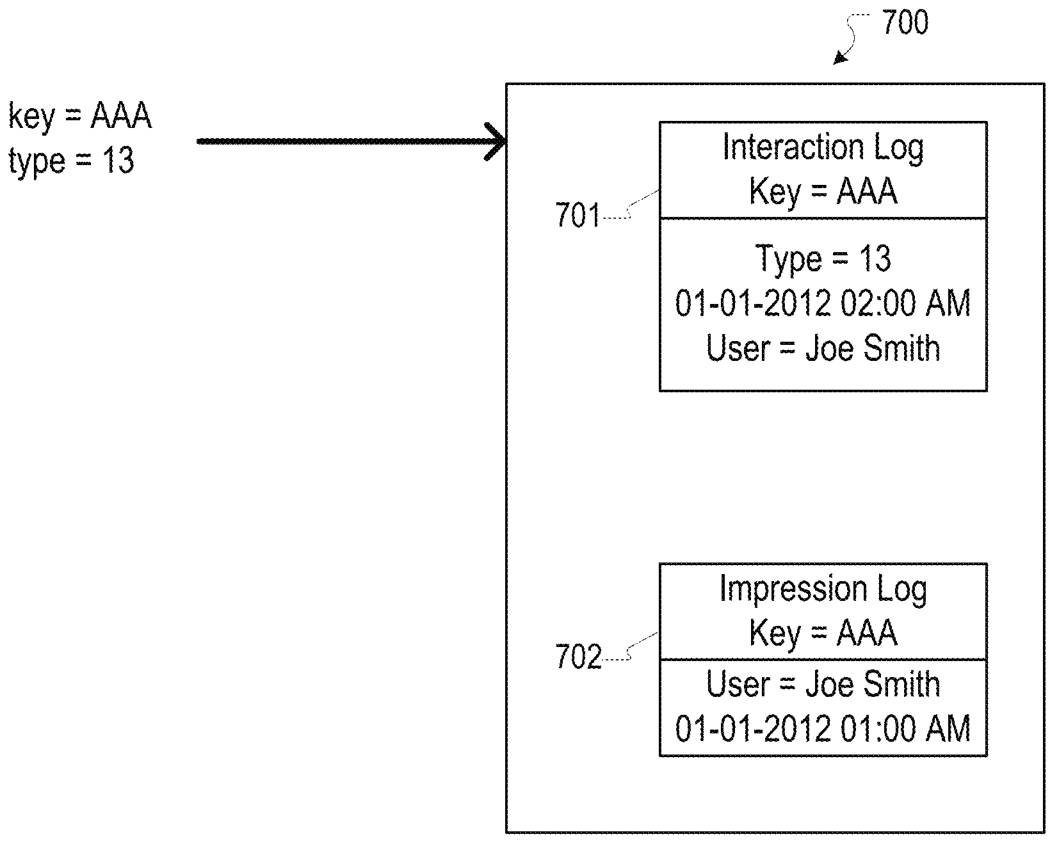
FIG. 7 depicts the contents of a memory caching system of a social networking system in accordance with an embodiment of the invention.

FIGS. 5, 6, and 7 illustrate various aspects of user interactions with stories in accordance with embodiments of the invention. In FIG. 5, a webpage 500 shows a news feed 501 of user Joe Smith. The news feed 501 includes stories 502, 503, and 504 indicating that user Jane Doe has posted an article link, user John Doe has uploaded a photo, and user Jeff Smith has posted a status update, respectively. User Joe Smith, who is friends with these users, may see the webpage 500 upon logging into his account on the social networking system 130. As shown, upon seeing the link posted by user Jane Doe, Joe Smith writes "Thumbs up to this article!" in comment box 505, and clicks 'Comment' link 506 to submit the comment.

FIG. 6 depicts a portion of an example DOM 600 for the news feed 501 in accordance with an embodiment of the invention. The DOM 600 includes the elements corresponding to the story with which Joe Smith has interacted. In this example, Joe has accessed the social networking system 130 using a web browser on his desktop computer. Thus, the elements are represented as HTML tags similar to those of the DOM 300. Any suitable means of accessing the social networking system 130 and any process for modeling the story elements may be used. As a result of Joe Smith's comment on the story 502, an identifying key 602 from the element <news_story> 601 and an identifying type 603 from its embedded element <comment_box> 604 are retrieved from the DOM 600 and transmitted, along with the text of Joe's comment, to the social networking system 130.

FIG. 7 illustrates example contents 700 of the memory caching system 146 of the social networking system 130 for the example DOM 600 in accordance with an embodiment of the invention. As illustrated in FIG. 1, the memory caching system 146 may reside on one or more of the servers that comprise the social networking system 130. According to one embodiment of the invention, another suitable memory device may be used in addition to or in place of the memory caching system 146. The identifying key of the story that Joe Smith has interacted with and the identifying type of the component that Joe clicked on are received in the memory caching system 146 from the client device used by Joe Smith. Using this identifying key and type, the set of logs pertaining to the story that Joe interacted with is identified. The occurrence of Joe Smith's comment on Jane Doe's link—including Joe Smith's name, the time of the interaction, the component that Joe Smith interacted with, and the text of Joe Smith's comment—may be recorded in an interaction log 701. Further information pertaining to the interaction may be recorded in other logs using additional information retrieved with the identifying references. Data from these logs may ultimately be used to train machine learning models that determine which stories are presented in user Joe Smith's news feed or perform other optimizations and enhancements for Joe Smith and the social network's user base as a whole.

According to an embodiment of the invention, processes discussed in relation to FIGS. 4-7 may be used and adapted based on how the user has accessed the social networking system 130 to interact with web content such as stories. For example, the social networking system may provide portals and applications that enable access to the social networking system 130 from a variety of devices, including desktop PCs, tablets, and smartphones. However, because each type of device may have different tools and technical capabilities, the implementation details may vary according to device. For example, on desktop computers, the processes may be implemented with JavaScript, a scripting language that can be accommodated by most major desktop web browsers. However, JavaScript capability may be less common on mobile devices, and the processes may therefore be implemented on mobile devices in a manner that obviates the need for JavaScript. Similarly, certain devices may have additional technical features that allow for further adaptations. Any suitable implementation of the procedure may be used.

Web browsing technologies may involve the ability of a server to store data on the client computer in the form of a cookie. A cookie is a data file saved by a web server on a client computer that uniquely identifies the client user to the web server. In most instances, each cookie may be associated with one website and may be read or written by the web server that created it. Upon a user's first visit to a website, the web server may create a cookie on the hard drive of the client computer. The web server may save information pertaining to the user's activity on the website to the cookie periodically throughout the user's browsing session. The web server can automatically identify the user each time the user returns to the website during subsequent browsing sessions.

According to an embodiment of the invention, on devices that support cookie functionality, the number of requests and the amount of data transmitted from a user's client device to the social networking system 130 may be further minimized. Instead of generating a separate request to a server within the social networking system 130 for each user interaction, data pertaining to user interactions may be saved to the cookie and transmitted along with a subsequent request. Because tracking data is typically not mission-critical, transmission to the server can be delayed without disrupting operation of the social networking system 130 or detracting from the goal of optimizing user experience.

Figure 8:
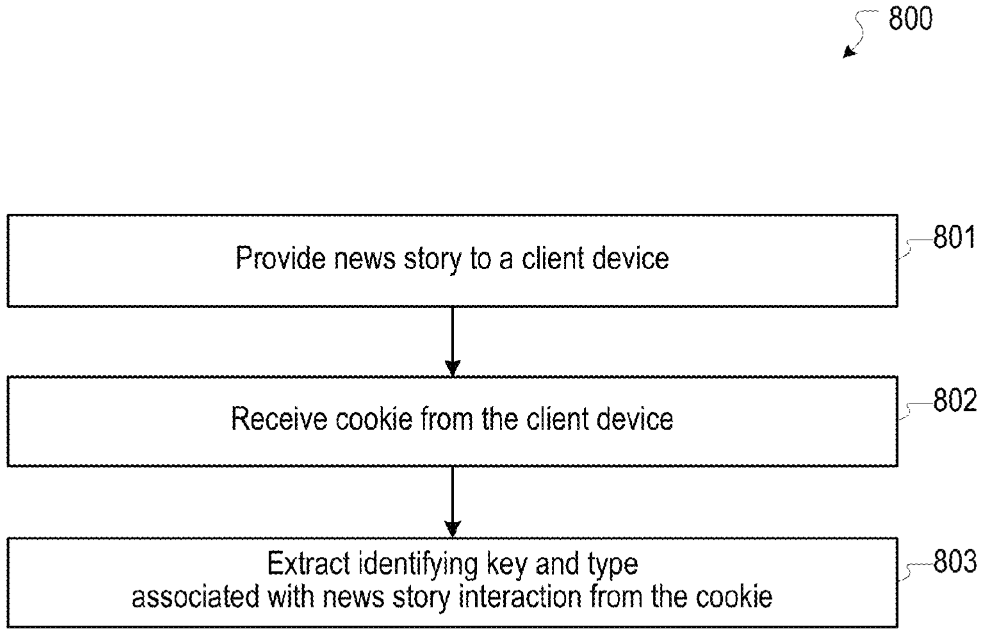
FIG. 8 illustrates a process for tracking story interactions on a device that supports cookie functionality in accordance with an embodiment of the invention.

FIG. 8 illustrates a process 800 for tracking story interactions on a client device that supports cookie functionality in accordance with an embodiment of the invention. At the outset, the user visits a portal of the social networking system 130 using a client device. The portal may be a website of the social networking system 130 or a specialized application for accessing the social networking system 130. The client device may be a desktop computer, a laptop computer, a tablet, a smartphone, or any other device that supports cookie functionality. Any suitable client device may be used. The user's browsing session is then recorded in a cookie on the hard drive of the user's client device. If the user is visiting the portal for the first time from his current device or has cleared his browser cache of all cookies since his last visit to the portal, then a new cookie may be created. If the user has previously visited the portal from his current device, then a cookie already exists and may be initialized with the current browsing session. At block 801, the social networking system 130 provides a story to the client device. The client device then receives an interaction with a story from the user. The client device retrieves at least the story key, the type of the specific element that the user interacted with, and the timestamp of the interaction from the DOM corresponding to the story. The client device records this information in the cookie. At block 802, the cookie management module 150 of the social networking system 130 receives the cookie from the client device. The transmission of the cookie from the client device to the social networking system 130 may be performed immediately, on the next request, after a fixed number of requests, or after the amount of data in the cookie reaches a threshold level. At block 803, the cookie management module 150 of the social networking system 130 extracts the identifying key and the identifying type associated with the story interaction from the cookie. In an embodiment of the invention, a timestamp of the interaction may also be extracted.

As noted above, some client devices may support JavaScript functionality, which further allows the number of requests and the amount of data transmitted from a user's client device to the social networking system 130 to be minimized. Because JavaScript is a client-side technology, it allows for certain interactive functionality to be implemented on a web page without requiring a request to the server or the transmission of data over the network. A web page may incorporate JavaScript elements to enable the browser to react to certain types of user interactions with the web page. For example, a web page may include JavaScript event listeners, which detect events such as clicks and trigger certain functionality in response.

One such event listener may retrieve data from a document's DOM upon the occurrence of a click. In an embodiment, the event listener may be referred to as 'click_ref'. On platforms that support JavaScript, click_ref may be used to traverse the DOM hierarchy of a story and retrieve the identifying key and the identifying type of the element or elements corresponding to the component or components with which the user has interacted. For example, in FIGS. 2 and 3, if a user viewing the story clicks on the link 202 corresponding to the element <user_name> 308, click_ref may be triggered at the element <user_name> 308. Click_ref retrieves the type of the element <user_name> 308 and traverses the hierarchy, retrieving the identifier at each level until it reaches the top most level. Thus, click_ref retrieves the type of the element <user_name> 308, the type of the element <user_profile> 302, and the key of the element <news_story> 301 before terminating. Click_ref thereby retrieves enough information to provide to the social networking system 130 to determine that the user has interacted with the story by accessing Jane Doe's profile via the text link.

According to one embodiment of the invention, JavaScript functionality may be used to respond to certain types of user interactions with stories without triggering a request or the transmission of data to a server. In one such embodiment of the invention, a lengthy story may be displayed in truncated form in a user's news feed. For example, an article link or a status update associated with a story may have several long comments attached to it. Displaying the entire comment thread would take up excessive amounts of space on the user's screen and require him to scroll repeatedly to reach the next story. Thus, the entire text of the story may be transmitted to the client at the outset but hidden and made accessible via a 'See more' link. According to this embodiment, rather than triggering a request to a server in the social networking system 130 to retrieve the remaining text, the 'See more' link activates a JavaScript function that "un-hides" it. Thus, an interaction with the story may occur without triggering a request to the server. However, because the operator of the social networking system 130 may wish to know that the user clicked on the 'See more' link, the click may be recorded in a cookie for later transmission as described above.

Figure 9A:
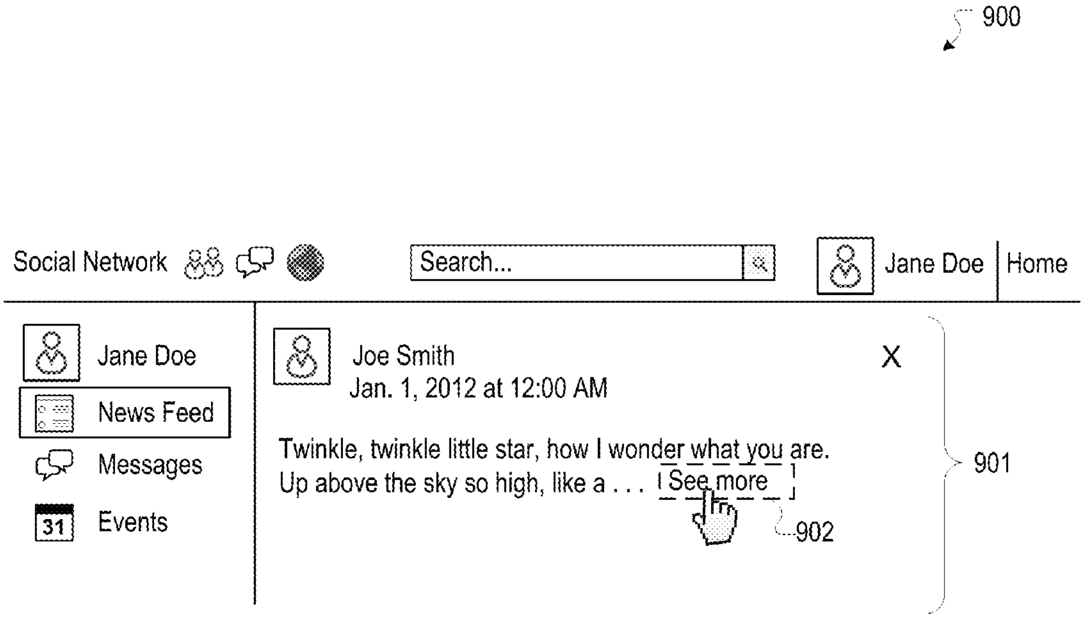
FIG. 9A depicts a story in a news feed in accordance with an embodiment of the invention.
Figure 9B:
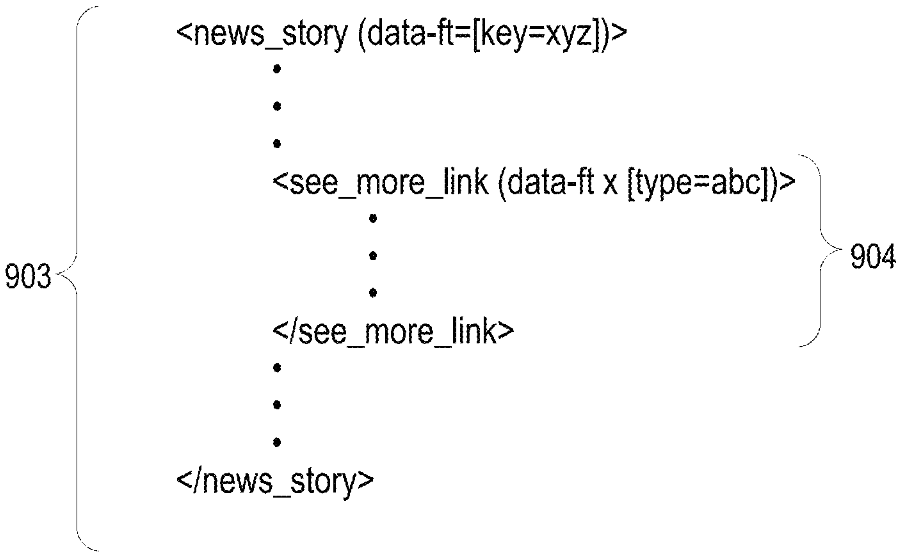
FIG. 9B depicts a portion of a document object model associated with a story in accordance with an embodiment of the invention.
Figure 9C:
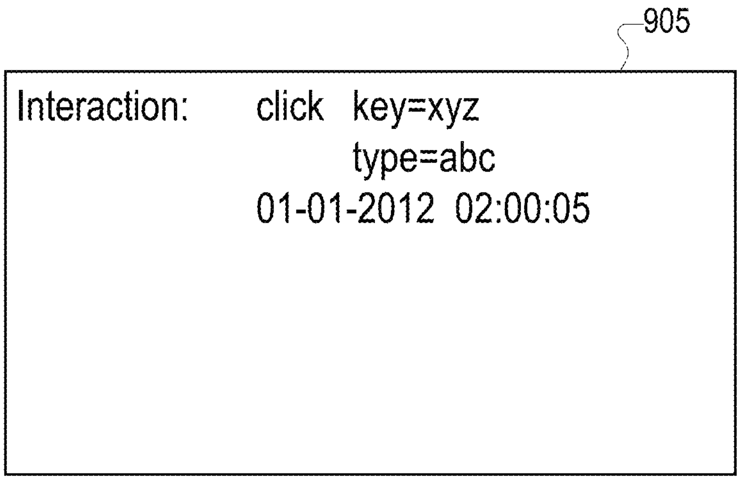
FIG. 9C depicts the contents of a cookie on a client device in accordance with an embodiment of the invention.

FIGS. 9A, 9B, and 9C illustrate the use of a cookie in tracking user interaction with a story in accordance with an embodiment of the invention. FIG. 9A depicts an example story 901 in a screen 900 comprising a status update by user Joe Smith in the news feed of user Jane Doe. The status update is too lengthy to display in its entirety and has thus been truncated with a 'See more' link 902. User Jane Doe clicks on the 'See more' link 902 to reveal the remainder of the status update. Her click on the 'See more' link 902 may trigger a JavaScript function that retrieves the key of the story 901 and the type of the element corresponding to the 'See more' link 902. FIG. 9B illustrates a portion of an example DOM associated with the story 901 in accordance with an embodiment of the invention. The DOM includes element <news_story> 903 and element <see_more_link> 904 corresponding to the story 901 and the 'See more' link 902, respectively. FIG. 9C illustrates the contents of a cookie 905 on the client device of user Jane Doe after she has clicked on the 'See more' link 902. As shown, the data written to the cookie 905 includes the key of the story 901 from the element <news_story> 903, the type of the 'See More' link 902 from the element <see_more_link> 904, and the timestamp of the interaction. This information may be transmitted to the social networking system 130 at suitable times as described above.

Using a hierarchical DOM structure reduces the size of the DOM of a story. According to one embodiment of the invention, the stories themselves may be embedded within other elements (such as elements corresponding to different types of pages, e.g., home page, profile page, etc.), and the operator of the social networking system 130 may wish to determine the specific location within the portal at which a user interacted with a story. For example, the operator may wish to determine whether the user accessed the story from within his news feed or from within the profile of the user who created the story. As discussed above, using a hierarchical model reduces complexity in formatting the underlying DOM of the story. If the elements were represented separately in a non-hierarchical fashion, a story's key (along with identifiers of elements higher up within the hierarchy) would have had to be embedded within each element of the DOM, which would increase the size of the underlying page source of the news feed significantly.

In an embodiment of the invention involving client devices that do not support JavaScript functionality, a hierarchical model for the story's DOM may not be feasible. In such contexts, the underlying DOM element of each story may need to include the story's key in order to uniquely identify the element. On mobile platforms, the additional data requirements of repetitively including the key in each element are mitigated by the more compact size of mobile media portals. According to one embodiment of the invention, the elements of a story on a mobile platform are uniquely identified by a concatenation of the story's key and the element's type. FIG. 10 depicts a DOM 1000 of the story 200 shown in FIGS. 2 and 3 modeled in a non-hierarchical manner in accordance with an embodiment of the invention. The unique identifier of each element may be a combination of the story's key and the element's type, separated by two ampersands ("&&"). For example, element <link_thumbnail> 1001 is uniquely identified by a concatenation 1002 of a key 1003 and a type 1004. Alternatively, the story's key may be included in a URL corresponding to the story.

Figure 11:
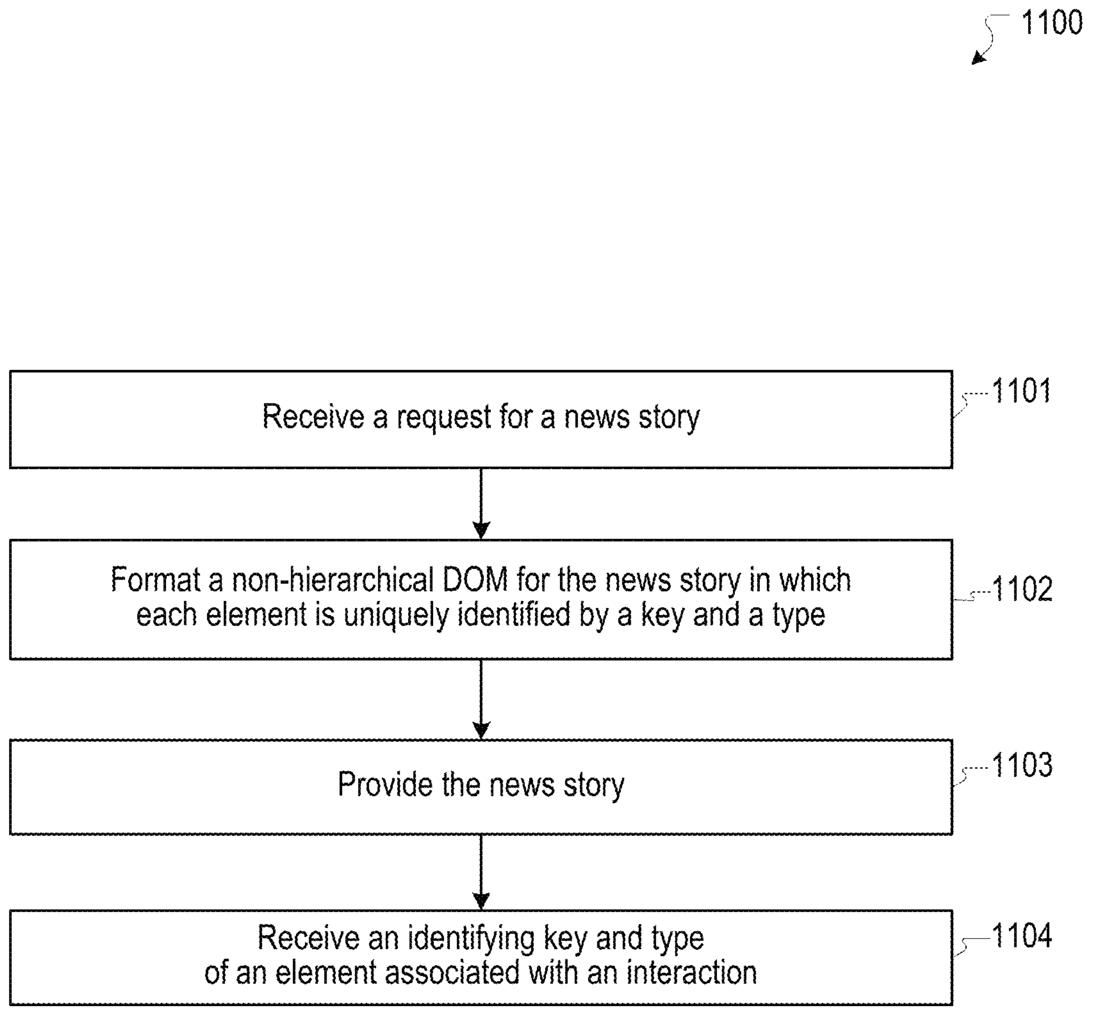
FIG. 11 illustrates a process for creating and transmitting a story to a mobile platform in accordance with an embodiment of the invention.

FIG. 11 illustrates a process for creating and transmitting a story to a mobile platform in accordance with an embodiment of the invention. Initially, the social networking system 130 receives an activity from a first user. The activity may be an article posting, a status update, a 'like', a photo upload, or any other interaction. Any activity may be used. The social networking system 130 creates a story for the activity. The story may include links to the first user's profile, a link to the content items being posted, or a link to the pictures being uploaded. Any type of data pertaining to the activity may be included in the story. The social networking system 130 receives a valid login from a second user. The second user may be a friend of the first user or any user who has access to the first user's profile. At block 1101, the social networking system 130 receives a request from the second user for a resource comprising at least one story from the first user. According to one embodiment of the invention, the resource may be the second user's news feed, which is presented to the second user upon logging in to the social networking system 130 or by accessing a 'home' screen. The news feed may comprise stories detailing the activity of the first user and others on the second user's list of friends, as well as other features specific to the mobile context (e.g., location-based functionality). Any implementation of the news feed may be used. According to another embodiment of the invention, the resource may be the first user's profile, which lists the stories generated by the first user's activity within the social network. At block 1102, the social networking system 130 formats a DOM for the story in which each element is uniquely identified by a combination of a key and a type. At block 1103, the social networking system 130 provides the story to the client device of the second user. The story is displayed on the second user's client device and the second user interacts with the story. At block 1104, the social networking system 130 receives an identifying key and type of an element associated with an interaction with the story by the second user. The interaction may be recorded in an interaction log in accordance with an embodiment of the invention. This record may include the fact that the story was presented to the second user on his mobile device.

For some types of stories, it may be desirable for the social networking system 130 to track a user interaction as it occurs rather than after minutes, hours, or another duration has passed. This may be particularly true for sponsored stories. A sponsored story may include an advertisement that is displayed to a user as a story. Sponsored stories may promote a product, service, or brand at the behest of any third party. In some implementations, the operator of the social networking system 130 may charge the third party for displaying the advertisement on a per click basis. Thus, the operator of the social networking system 130 may seek to ensure that the data collected regarding user clicks is reliable and up to date. A process similar to the one illustrated in FIG. 8 may not be suited to these goals, since a cookie can be deleted or manipulated by a user before the data in that cookie is transmitted to the server. Moreover, the social networking system 130 may need to include more data in the DOM for sponsored stories. In addition to the key of the story and the type of the constituent elements, the social networking system 130 may be required to include other data on behalf of the advertiser or information that is specific to the advertising context.

According to one embodiment of the invention, a story may be accompanied by an encrypted impression. In an embodiment, the story accompanied by an encrypted impression may be a sponsored story. The encrypted impression may include advertising data that is based on the particular advertisement, the advertiser, the user, the advertising context in general, or any other information. Because the social network and the advertiser may not wish to expose this data to the user, the information may be encrypted. Encryption increases the size of data substantially. For example, according to one embodiment of the invention, an encrypted impression may be as large as 600 bytes or more. This amount of data may be too large or inappropriate to be stored in a cookie. To address these issues, the operator of the social networking system 130 may implement functionality that does not rely on cookies and reliably tracks the number of clicks as they happen.

According to one embodiment of the invention, the identifying references may be provided from a client device both to the memory caching system 146 of the social networking system 130 to record user interactions and to the advertisement module 148 of the social networking system 130 to, for example, keep track of clicks for advertising purposes. In one embodiment of the invention, data from a sponsored story interaction may be stored in a cookie and transmitted later for interaction tracking purposes in relation to the social networking system 130 or transmitted immediately for advertisement tracking purposes or both. The encrypted impression containing the advertising-specific information may not be included in the data written to the cookie, but may be transmitted to a separate module dedicated to tracking advertising impressions and clicks. For example, referring to FIG. 1, the identifying key and the identifying type may be received by the memory caching system 146 while the encrypted impression is received by the advertisement module 148. Transmission of the encrypted impression to the advertisement module 148 may be initiated before writing of the key and type to the cookie is initiated or completed (e.g., asynchronously). Any suitable process for processing the encrypted impression may be used.

Figure 12:
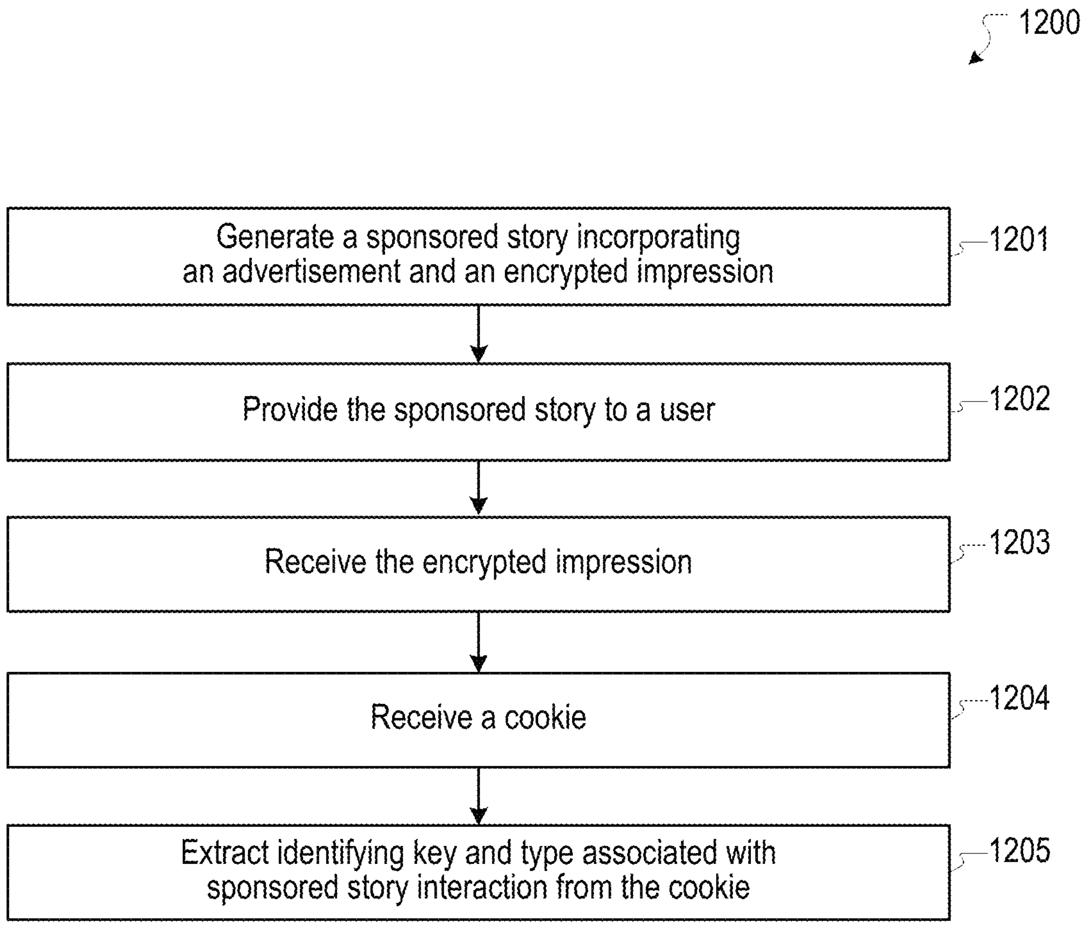
FIG. 12 illustrates a process for creating and tracking a sponsored story in accordance with an embodiment of the invention.

FIG. 12 illustrates a process 1200 for creating and tracking a sponsored story in accordance with an embodiment of the invention. Initially, an advertisement request is received by the social networking system 130 from an advertiser. At block 1201, the social networking system 130 generates a sponsored story incorporating an advertisement from the advertiser. According to one embodiment of the invention, the underlying DOM of the sponsored story may incorporate an encrypted impression with information based on the advertiser, the advertisement, the advertising context in general, or other information. At block 1202, the sponsored story is provided to a user who has logged into his account on the social networking system 130. The sponsored story may be selected for display to the user based on the user's prior activity, the user's profile data, or any other appropriate criteria.

The user's client device then receives an interaction with the sponsored story from the user. Upon receiving the interaction, the user's client device retrieves at least the key of the sponsored story and the type of the element within the story that the user interacted with from the DOM of the story. The user's client device records the key and the type in a cookie. The user's client device then retrieves the encrypted impression from the DOM of the story and transmits the encrypted impression to the social networking system 130. At block 1203, the social networking system 130, or the advertisement module 148 in particular, receives the encrypted impression. At block 1204, the social networking system 130, or the memory caching system 146 in particular, receives the cookie. As with process 800, the transmission of the cookie from the client device to the social networking system 130 may be performed immediately, on the next request, after a fixed number of requests, or after the amount of data in the cookie reaches a threshold level. At block 1205, the identifying key and type associated with the sponsored story interaction are extracted from the cookie by the cookie management module 150.

Hardware Implementation

Figure 13:
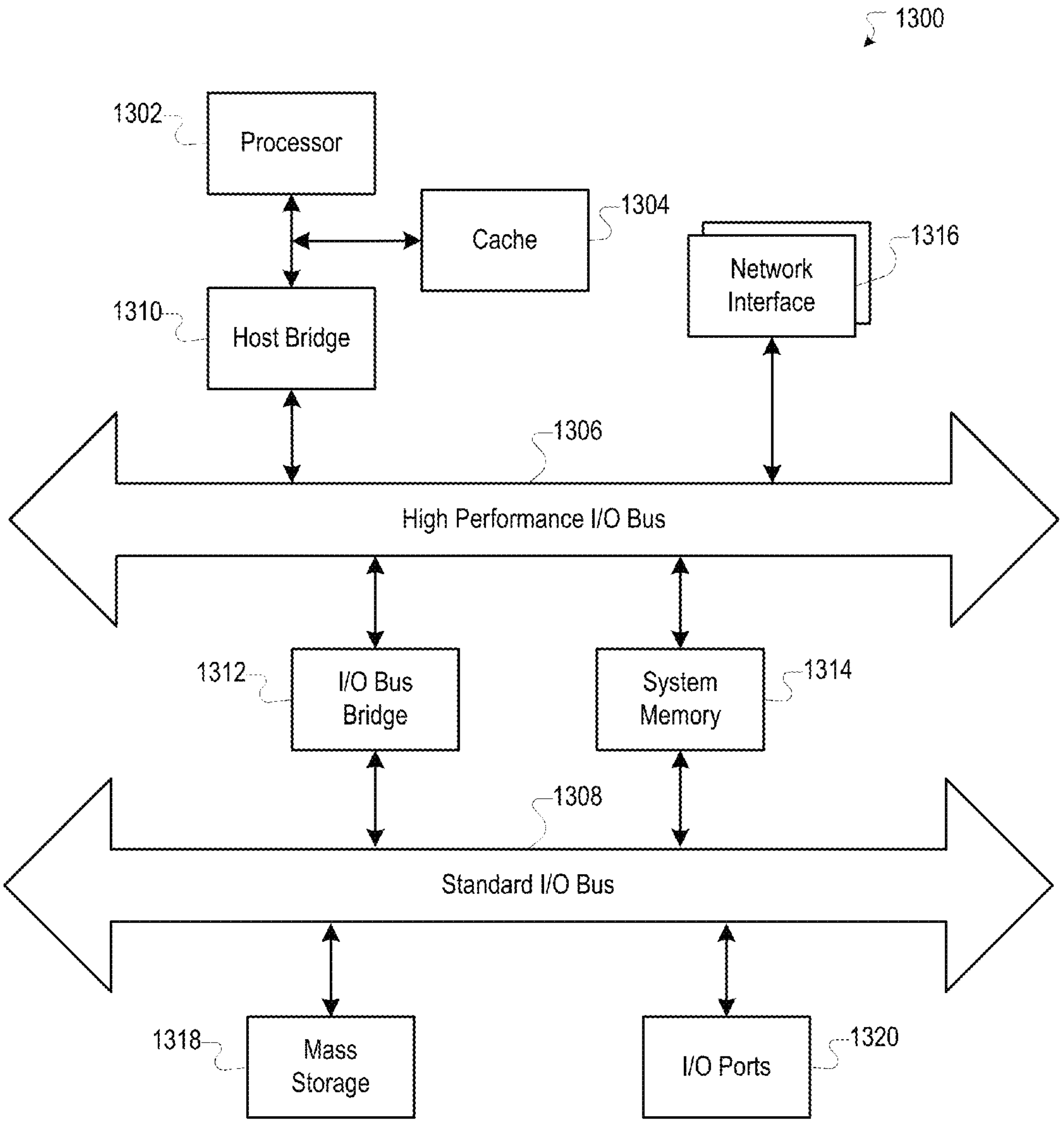
FIG. 13 depicts a hardware implementation of a social networking system in accordance with an embodiment of the invention.

The foregoing processes and features can be implemented by a wide variety of machine and computer system architectures and in a wide variety of network and computing environments. FIG. 13 illustrates an example of a computer system 1300 that may be used to implement one or more of the computing devices identified above. The computer system 1300 includes sets of instructions for causing the computer system 1300 to perform the processes and features discussed herein. The computer system 1300 may be connected (e.g., networked) to other machines. In a networked deployment, the computer system 1300 may operate in the capacity of a server machine or a client machine in a client-server network environment, or as a peer machine in a peer-to-peer (or distributed) network environment. In an embodiment of the invention, the computer system 1300 may be the social networking system 130, the user device 110, and the external system 120, or a component thereof. In an embodiment of the invention, the computer system 1300 may be one server among many that constitutes all or part of the social networking system 130.

The computer system 1300 includes a processor 1302, a cache 1304, and one or more executable modules and drivers, stored on a computer-readable medium, directed to the processes and features described herein. Additionally, the computer system 1300 includes a high performance input/output (I/O) bus 1306 and a standard I/O bus 1308. A host bridge 1310 couples processor 1302 to high performance I/O bus 1306, whereas I/O bus bridge 1312 couples the two buses 1306 and 1308 to each other. A system memory 1314 and one or more network interfaces 1316 couple to high performance I/O bus 1306. The computer system 1300 may further include video memory and a display device coupled to the video memory (not shown). Mass storage 1318 and I/O ports 1320 couple to the standard I/O bus 1308. The computer system 1300 may optionally include a keyboard and pointing device, a display device, or other input/output devices (not shown) coupled to the standard I/O bus 1308. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1300, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1300 are described in greater detail below. In particular, the network interface 1316 provides communication between the computer system 1300 and any of a wide range of networks, such as an Ethernet (e.g., IEEE 802.3) network, a backplane, etc. The mass storage 1318 provides permanent storage for the data and programming instructions to perform the above-described processes and features implemented by the respective computing systems identified above, whereas the system memory 1314 (e.g., DRAM) provides temporary storage for the data and programming instructions when executed by the processor 1302. The I/O ports 1320 may be one or more serial and/or parallel communication ports that provide communication between additional peripheral devices, which may be coupled to the computer system 1300.

The computer system 1300 may include a variety of system architectures, and various components of the computer system 1300 may be rearranged. For example, the cache 1304 may be on-chip with processor 1302. Alternatively, the cache 1304 and the processor 1302 may be packed together as a "processor module", with processor 1302 being referred to as the "processor core". Furthermore, certain embodiments of the invention may neither require nor include all of the above components. For example, peripheral devices coupled to the standard I/O bus 1308 may couple to the high performance I/O bus 1306. In addition, in some embodiments, only a single bus may exist, with the components of the computer system 1300 being coupled to the single bus. Furthermore, the computer system 1300 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1300 that, when read and executed by one or more processors, cause the computer system 1300 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1300, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1302. Initially, the series of instructions may be stored on a storage device, such as the mass storage 1318. However, the series of instructions can be stored on any suitable computer readable storage medium. Furthermore, the series of instructions need not be stored locally, and could be received from a remote storage device, such as a server on a network, via the network interface 1316. The instructions are copied from the storage device, such as the mass storage 1318, into the system memory 1314 and then accessed and executed by the processor 1302.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1300 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:

embedding, by at least one computing device, references in content formatted in a markup language, the references coded in the markup language to designate at least a portion of the content as corresponding to at least a component in a hierarchical structure, wherein the hierarchical structure corresponds to one or more components in a social network object in a social network system;

dynamically generating, by the at least one computing device, a markup language document including the content for presentation, via a website or an application of the social network system, to a user device associated with a user account;

receiving, by the at least one computing device, at least one identifying reference from a client device record, reflecting a user interaction with the markup language document, stored in the user device, the identifying reference from among the embedded references in the content formatted in the markup language;

determining, based on the received identifying reference and relative to the hierarchical structure, the component associated with the user interaction; and associating, by the at least one computing device into an interaction record, the user account with an identifier of the component to track one or more user interactions respectively with the components of the social network object across one or more dynamically generated documents of the social networking system.

2. The method of claim 1 wherein the references include a key associated with the social network object.

3. The method of claim 1 wherein the references include types associated with the components in the social network object.

4. The method of claim 1 wherein the references are coded in a hierarchical structure corresponding to the hierarchical structure of the social network object.

5. The method of claim 1 wherein the social network object is a user activity story in the social network system.

6. The method of claim 1 wherein the interaction record indicates that the user selected the component within the social network object.

7. The method of claim 1 further comprising identifying the component of the social network object with which the user interacted.

8. The method of claim 1, wherein embedding the references include providing the content with one or more hypertext markup language elements to designate a level within the hierarchical structure of the social network object, wherein each of the hypertext markup language elements includes at least one of the references.

9. The method of claim 1 further comprising modeling the social network object as a document object model.

10. The method of claim 1 further comprising causing the at least one identifying reference to be written to a website cookie on a client device, wherein the client device record is the website cookie.

11. The method of claim 1 further comprising embedding an encrypted impression in the content, wherein the encrypted impression is associated with the social network object.

12. The method of claim 1 further comprising receiving an encrypted impression having advertising data.

13. The method of claim 1 further comprising providing the content as an advertisement.

14. The method of claim 1 further comprising receiving an encrypted impression having advertising data before receipt of the at least one identifying reference.

15. The method of claim 1 further comprising recording provision of the content to the user in an impression log.

16. The method of claim 1 further comprising recording the interaction record in an interaction log in a memory caching system.

17. The method of claim 1 further comprising training a machine learning model based on the interaction record.

18. A computer-storage memory apparatus storing computer-executable instructions that, when executed, cause a computer system to perform a computer-implemented method comprising:

embedding references in content formatted in a markup language, the references coded in the markup language to designate at least a portion of the content as corresponding to at least a component in a hierarchical structure, wherein the hierarchical structure corresponds to one or more components in a social network object in a social network system;

dynamically generating a markup language document including the content for presentation, via a website or an application of the social network system, to a user device associated with a user account of the social network system;

receiving at least one identifying reference from a client device record, reflecting a user interaction with the markup language document and stored in the user device, the identifying reference from among the embedded references in the content formatted in the markup language, wherein the identifying reference identifies the portion of the content in reference to the component in the hierarchical structure;

determining, based on the received identifying reference and relative to the hierarchical structure, the component associated with the user interaction; and associating the user account with an identifier of the component in the hierarchical structure to track one or more user interactions respectively with the components of the social network object across one or more dynamically generated documents of the social networking system.

19. A system comprising:

at least one processor; and a memory storing instructions configured to instruct the at least one processor to:

embed references in content formatted in a markup language, the references coded in the markup language to designate at least a portion of the content as corresponding to at least a component in a hierarchical structure, wherein the hierarchical structure corresponds to one or more components in a social network object in a social network system;

dynamically generate a markup language document including the content for presentation, via a website or an application of the social network system, to a user device associated with a user account of the social network system;

receive at least one identifying reference from a client device record, reflecting a user interaction with the markup language document and stored in the user device, the identifying reference from among the embedded references in the content formatted in the markup language, wherein the identifying reference identifies the portion of the content in reference to the component in the hierarchical structure;

determining, based on the received identifying reference and relative to the hierarchical structure, the component associated with the user interaction; and associate the user account with an identifier of the component in the hierarchical structure to track one or more user interactions respectively with the components of the social network object across one or more dynamically generated documents of the social networking system.

* * * * *